United States Patent [19]

Mauchan

[11] Patent Number: 5,249,008
[45] Date of Patent: Sep. 28, 1993

[54] PHOTOGRAPHIC OVERLAY ASSEMBLY

[75] Inventor: Donald E. Mauchan, Marlboro, Mass.

[73] Assignee: Polaroid Corporation, Cambridge, Mass.

[21] Appl. No.: 899,601

[22] Filed: Jun. 15, 1992

[51] Int. Cl.$^5$ .................. G03B 17/24; G03B 17/26
[52] U.S. Cl. ..................................... 354/108; 354/276
[58] Field of Search .............. 354/108, 276, 278, 275, 354/296

[56] References Cited

U.S. PATENT DOCUMENTS

| | | | |
|---|---|---|---|
| 3,916,423 | 10/1975 | Ueda et al. | 354/108 |
| 4,052,728 | 10/1977 | Hendry et al. | 354/108 |
| 4,268,144 | 5/1981 | Wheeler | 354/108 |
| 4,317,626 | 3/1982 | Poshkus | 354/180 |
| 4,816,848 | 3/1989 | Doyle | 354/108 |
| 4,894,671 | 1/1990 | Wheeler | 354/108 |
| 4,942,412 | 7/1990 | Wheeler | 354/125 |
| 5,144,348 | 9/1992 | DiSanzo et al. | 354/108 |
| 5,181,059 | 1/1993 | Mauchan | 354/108 |

Primary Examiner—Michael L. Gellner
Assistant Examiner—Joe N. Noh
Attorney, Agent, or Firm—John J. Kelleher

[57] ABSTRACT

An overlay with indicia is sandwiched between a pair of flat plates to form an assembly which is adapted to be mounted in the exposure window of a film cassette housing. The assembly locates the overlay out of any physical contact with film units in the cassette.

5 Claims, 2 Drawing Sheets

PHOTOGRAPHIC OVERLAY ASSEMBLY

FIELD OF THE INVENTION

This invention relates to a photographic overlay assembly, including a holder and an overlay, which is adapted to fit in an exposure window of a cassette of film units, which cassette is to be mounted within a camera. The overlay includes indicia to be photographically imprinted on each of the film units in the cassette at the time of their exposure.

BACKGROUND OF THE INVENTION

Suitable camera structure for use in association with film cassettes, preferably of the self-developing type, takes many forms which are well known in the industry. Most all commercially available instant cameras are suitable for use with this invention. By way of example, U.S. Pat. No. 4,052,728 to Hendry et al describes a suitable instant camera and its operational parts. To the extent necessary for a full understanding of the invention described herein, such patent is incorporated by reference.

The invention as described herein is primarily concerned with a photographic overlay assembly which includes a holder for overlays, templates or masks which may be mounted in the exposure window of a film cassette before the cassette is inserted into a camera. The overlay is intended to serve the same function as all other overlays known in the industry, namely, to support indicia on the overlay which indicia are imprinted on film units as photographs are taken in the normal course of events. The object is to photographically imprint the indicia on each film unit. Some specific indicia are commercially available but as an option the indicia selected by the photographer may be made to order. Examples of the state of the art on structure to mount image bearing templates or overlays include U.S. Pat. Nos. 3,916,423; 4,268,144; 4,317,626; 4,816,848; 4,894,671; and 4,942,412.

In U.S. Pat. No. 3,916,423 to Ueda et al, an overlay or template is formed by a relatively thick and rigid plate of glass or similar material. In one form, the rigid overlay of Ueda et al is a rectangular body dimensioned the same as an exposure window in a cassette, with four outwardly directed projections on the side edges intended to depress the film units in the film pack housing. The projections fit below a forward wall of the cassette forming the exposure window to hold the template in place. In another form of the rigid overlay of Ueda et al, insertability thereof into the film cassette window is enabled by forming the major body of the overlay with peripheral dimensions somewhat smaller than the cassette window so that tabs projecting from opposite sides of the overlay can be inserted through the window and will underlie the forward wall of the cassette in which the exposure window is formed. The thickness of the overlay causes diffraction of the subject image and results in displacement of the objective focal plane from the surface of the uppermost film unit in the cassette. Sharpness of the subject image can be accommodated by a combination of restricting the thickness of the tabs holding the overlay in the window and selecting the index of refraction of the material from which the overlay is formed to correct for displacement of the objective focal plane.

A patent to Wheeler, U.S. Pat. No. 4,268,144, employs a relatively thin and pliant overlay or template having projecting tabs extending from three sides and adapted to underlie the cassette's wall in which the exposure window is formed. To retain the overlay against movement in the same direction as an underlying film unit as the latter is ejected from the cassette for processing after exposure, the leading edge of the overlay is formed with a central, generally up-struck limit tab. To otherwise orient the template in relation to the exposure window, Wheeler relies on edge portions of the thin sheet which, of necessity, fit within the pack with minimum clearance space between the overlay edges and the side walls of the film cassette. Also, insertion and removal of the Wheeler overlay requires manual manipulation at the image surface thereof thus possibly smudging it with finger prints. Variation of this general concept are illustrated in subsequent Wheeler U.S. Pat. Nos. 4,894,671 and 4,942,412.

The image bearing overlay or template of U.S. Pat. No. 4,816,848 to Doyle is embodied in a thin pliable sheet having a lateral dimension equal to or less than the width of the exposure window in which it is used and a longitudinal dimension greater than the length of such an exposure window. A pair of raised edge portions, in the form of L-shaped strips of a length substantially equal to the width of the window are attached across the upper surface of the pliable sheet at locations corresponding to the front and rear edges of the exposure window. These raised edge portions operatively locate and maintain the position of the overlay within the exposure window of the film cassette. Further, the raised edge portions aid in the insertion and removal of the template and help to keep the image surface of the overlay free from fingerprints. Moreover, the raised edge portions provide an increment of rigidity to the overlay to keep it flush with an image receiving surface of each successive film unit.

Finally, U.S. Pat. No. 4,317,626 shows (FIG. 9) a template containing written information which is adapted to be interposed between the subject to be photographed and a film unit.

There are two problems which exist in the above-described prior art involving overlays or templates mounted in the exposure window opening in a film cassette and they are that (1) one surface of the overlay is in contact with one surface of a film unit and (2) the overlay is often overlooked and unintentionally discarded with the empty film cassette after the film units have all been exposed and ejected. Contact between the overlay and the film unit can result in scratching or abrading of the contact surfaces of the overlay due to the fact that the film units are moved longitudinally of the overlay after exposure and over time they inherently wear on any surface with which they are in contact. Clearly this is a problem if the photographer desires to reuse the overlay in another film cassette or any set of subsequent film cassettes.

SUMMARY OF THE INVENTION

To solve these two problems this invention mounts the overlay or template in the exposure window of the film cassette and maintains it out of contact with the film units at all times. This feature is accomplished by mounting the thin transparent overlay in a holder defined by a pair of flat, thin plates. The plates are of different sizes with an upper plate being of larger transverse and longitudinal dimensions than a lower plate and the lower plate being of a size and shape to snugly fit into the exposure window of the film cassette. Film cassettes themselves are standard in their shape and dimensions with respect to film cassettes used in a given camera. The geometric configuration of the cassette of this invention and the physical arrangement of its various components obviously impose certain spatial design constraints on any apparatus with which it is to be used. In addition to being geometrically compatible with the cassette, the particular apparatus with which it will be used, whatever its form, should also provide certain operating functions that will satisfy the ultimate task of automatically producing a finished picture. In this respect, it is useful to think of these operating functions in terms of two broadly generalized categories. The first may be termed the traditional category which embraces all of those functions that are common to all photographic systems. One way to illustrate this category of functions is to recall the conventional definition of a camera. By definition, a camera is a device for making a record of the image of an object formed when rays of light pass through a lens and fall on a flat surface, the film plane, which supports a sheet of film. The camera's essential parts include an exposure chamber into which the light rays can be admitted by a lens, when a shutter is opened, to form an image in a photosensitive material such as one of the film units. The other category of functions would include all of those functions normally associated with fully automated photographic systems. Included here would be all of those functions that a user would normally perform in a conventional photographic process but does not in a fully automatic system. By way of example, these would include automatic exposure control, film advance, and film processing. In the fully automatic system then, the user simply loads the film cassette, focuses the camera, frames his subject of interest and presses a system initiating button. The system does the rest. It is understandable how these automated systems can become complex in nature and rather difficult to economically manufacture. In any case, camera manufacture is not a part of this invention. This invention is concerned with structure for mounting an image bearing overlay in the exposure window of a film cassette. The structure includes a holder consisting of two parallel plates, preferably of transparent plexiglass between which the overlay is to be located.

The upper of the two plates includes a downwardly extending ridge generally in the shape and size of the exposure window of the film cassette and the ridge and upper plate combined form a pocket into which the overlay and the lower plate will fit. The length and width of the lower plate is substantially the same as the corresponding distances between the interior surfaces of the ridge and is thus frictionally held in place. The overlay being sandwiched between the two flat plates preferably is maintained out of any direct physical contact with the film units in the cassette. Indeed, the structure used in this invention for mounting the overlay in place may be dimensioned to maintain the lower plate just out of direct physical contact with the film units or in substantially light contact with the film units.

An observation of the prior art as exemplified by the patents cited above shows all of the overlay holding structure except the '626 patent to include a tab or projection of some kind fitting the overlay or a part of the overlay holder inside the cassette in contact with the internal surface of the forward wall of the cassette and the next available film unit immediately prior to its exposure, thus possibly the overlay to scratching during removal of the film unit subsequent to its exposure.

BRIEF DESCRIPTION OF THE DRAWINGS

The novel features that are considered characteristic of the invention are set forth in the appended claims. The invention itself, however, both as to its organization and its method of operation, together with additional objects and advantages thereof, will best be understood from the following description when read in connection with the accompanying drawings wherein like numbers have been employed in the different figures to denote the same parts and wherein:

DESCRIPTION OF THE PREFERRED EMBODIMENTS

Figure 1:
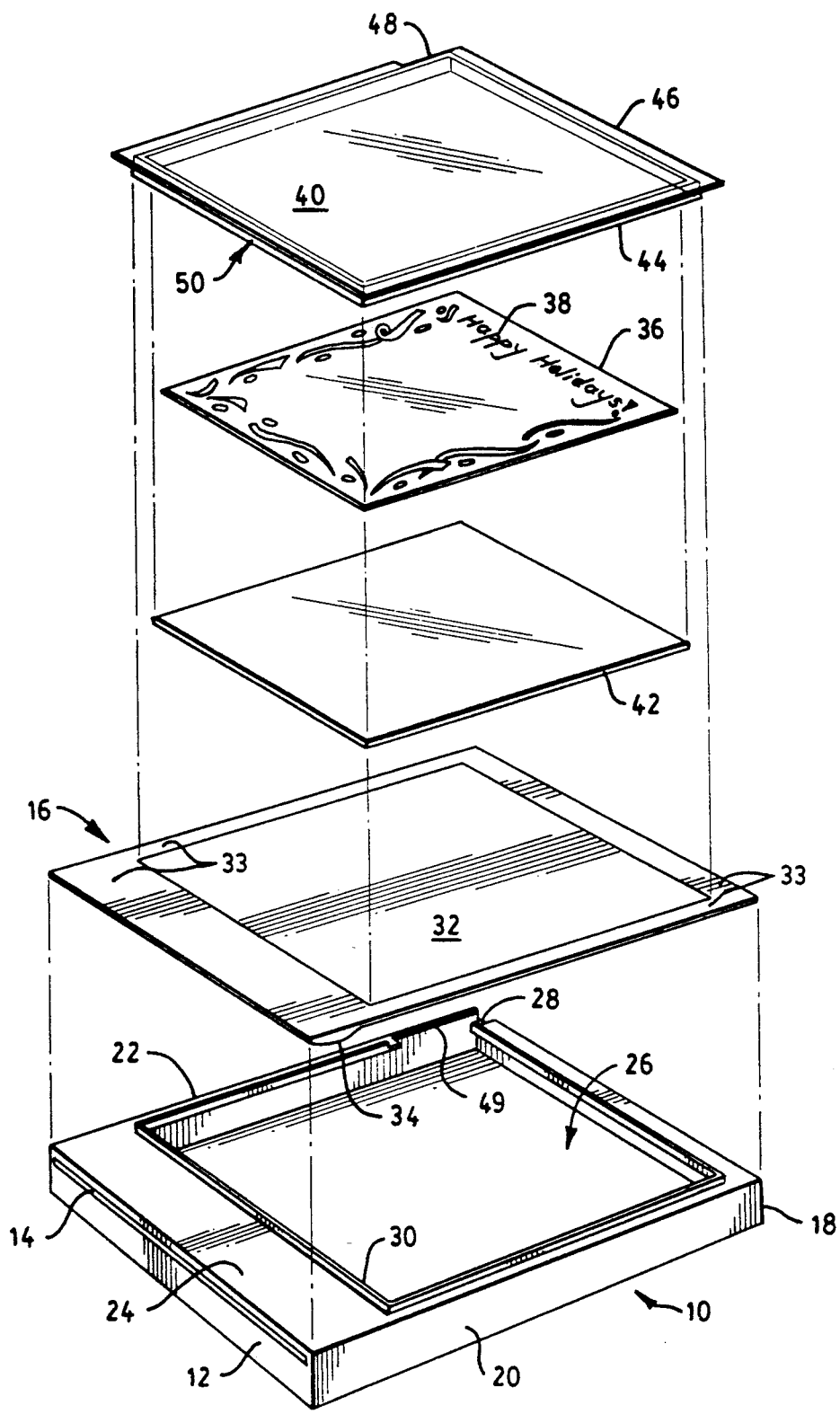
FIG. 1 is an exploded view of a film cassette combined with a photographic overlay assembly according to this invention.

FIG. 1 illustrates a film cassette in combination with a photographic overlay assembly consisting of a holder and a transparent overlay for mounting in the exposure window of the film cassette. A film cassette 10, conventional in configuration and operation, includes a leading end wall 12 having a slot 14 for the sequential discharge of film units 16 mounted therein. The leading end wall 12 and a trailing end wall 18 are joined by side walls 20 and 22 to form a generally rectangular shape.

Conventionally a plurality of instant film units (only one shown) 16 are mounted in a stack within the cassette 10 and are biased upwardly by a spring (not shown) such that one film unit is always in an exposure position against the inside surface of a forward wall 24 when the camera has been activated to take a photograph. At the time the film cassette is placed in the camera, a dark slide (not shown) is located between the uppermost film unit in the stack and the interior surface of the forward wall 24 defining the exposure window 26 to prevent premature exposure of film units to light. At such time as the camera and film cassette are activated to exposure conditions the dark slide is removed in conventional fashion by a pick in the camera sliding through a slot 28 in the trailing end wall 18 and pushing the dark slide out of the cassette through the slot 14. That allows the biasing spring to push the stack of film units upwardly thus locating the top film unit 16 against forward wall 24.

An upstanding rib 30 extends around all four sides of the exposure window or exposure opening 26. Rib 30 serves the purpose of strengthening the wall 2 at the edges of the window 26 and very specifically minimizes crack formations. Rib 30 and the forward wall 24 are cut-away along the sidewall 22 as an extension of the slot 28 to accommodate the reciprocating movement of the pick which discharges the dark slide and the exposed film units.

Note that the film unit 16 has a film exposure frame 32 about the same size as the exposure window 26. At the forward end of the film unit 16 is a pod of developer liquid 34 which is ruptured in conventional fashion during the developing process, such operations are well known in the industry and will not be further described.

A transparent overlay 36 having indicia 38 imprinted thereon on the side facing the film unit 16 is shown between an upper flat plate 40 and a lower flat plate 42. The indicia may be imprinted on the overlay with ink which is either transparent, translucent or opaque. A ridge 44, which is formed integrally with the plate 40 projects downwardly from the flat surface of upper flat plate 40 to define a generally rectangular shape having length and width dimensions which are slightly less than the corresponding dimensions of the exposure opening 26. The length and width of the plate 40 are slightly greater than the corresponding dimensions of the exposure window 26 such that a locking flange 46 or overhang extends transversely outwardly from ridge 44 as a part of the flat upper plate 40 except at one edge where it has a cut-away section 48 to correspond in size and location to the cut-away section 49 of the forward wall 24 adjacent to the slot 28 to accommodate movement of the pick.

While the flange 46 is illustrated as extending transversely outwardly from the ridge 44 on all four sides, it will be appreciated upon a full reading of this specification that an unbroken flange completely around the ridge 44 is not necessary for proper functioning of the invention. What is required for proper operation is that one dimension of the plate 40 be greater than the corresponding dimension of the exposure window 26 whereby the flange 46 may engage the rib 30 when the overlay assembly is pushed into place in the exposure window 26.

For proper operation the overlay 36 must be of a size and shape to fit into the pocket 50 formed by the upper flat plate 40 and the ridge 44 such that the overlay 26 will lie flat in the pocket against the lower flat surface of plate 40. Lower plate 42 is of a size and shape to enter into the pocket 50 to cover the transparent overlay 36 and hold it in a stationary operative position during the filming operation. As may be observed in FIG. 2 the combined thicknesses of the overlay 36 and the lower plate 42 are preferably substantially equal to the depth of the pocket 50 and thereby do not create undesirable edges which might scrape the upper surface of film unit 16 when it is ejected through slot 14. The bottom surfaces of the ridge 44 may contact the four sides of a mask 33 which encompasses or defines the exposure frame 32; or preferably they may be dimensioned to be located just out of contact therewith. Thus, if there is contact between the mask 33 and the bottom surfaces of the ridge 44, the thickness of the former will keep said surfaces out of contact with the frame 32 during its movement from the film cassette.

Figure 2:
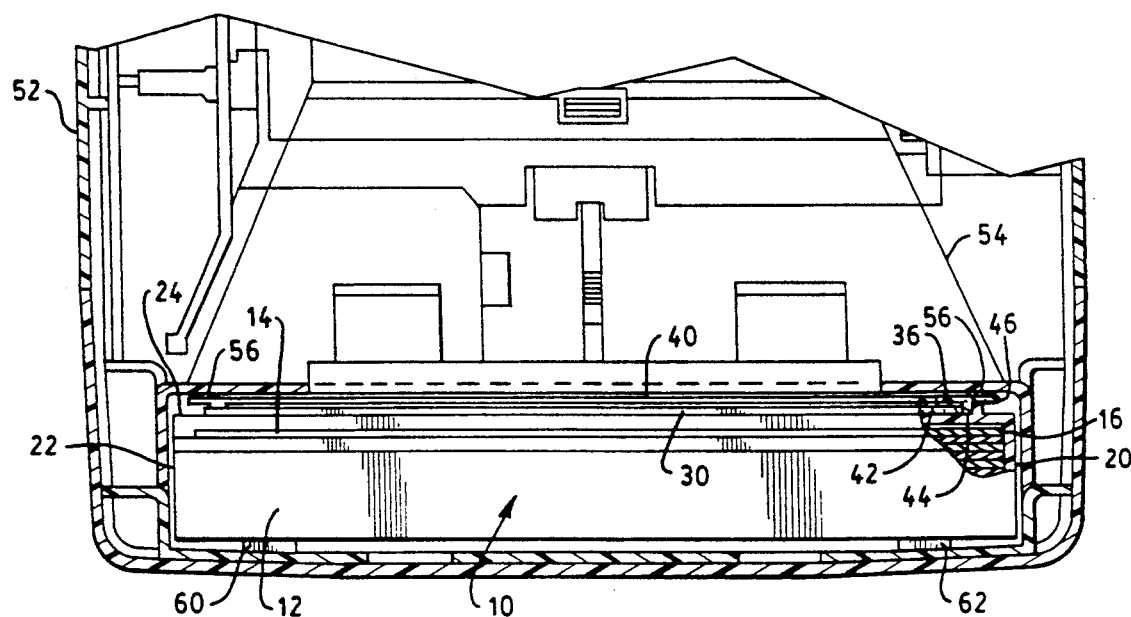
FIG. 2 is a fragmentary sectional view of an open end of an exposure chamber of a camera having a film cassette slidably received therein and having an overlay assembly according to this invention mounted in operative position, the camera being of the type described in the aforementioned Hendry et al. patent.

FIG. 2 illustrates the film cassette 10 in operative position within a camera housing 52. The internal elements of the camera are not of particular significance and are conventional except for a rigid exposure cone 54 which is in the shape of a hollow, four-sided pyramid having a lower edge 56 abutting the flange 46 of the upper flat plate 40 to hold it in position in the exposure window 26 while the film cassette 10 is within the camera. The lower edge 56 of the cone 54 extends along the bottom four sides of the cone (except for the area immediately above the cut-away section 48) and functions, in cooperation with a pair of leaf springs 60 and 62, to maintain the flange 46 in engagement with the rib 30 of the film cassette 10. The springs 60 and 62 also function to resiliently bias the film cassette 10 upwardly toward the open bottom of the cone 54.

Exposure cone 54 is a part of a passage for light reflected from an object to photographed and directed to exposure window 26. It includes a mirror (not shown) near its rear surface to reflect image bearing light rays downward through the flat plates 40 and 42, the overlay 36, and the exposure window 26 where the image of the object to be photographed and the indicia on the overlay 36 are imprinted simultaneously on the film unit 16 in the film frame 32. Immediately thereafter the film unit 16 is ejected from the cassette 10 through the slot 14 and into the bite of a pair of rollers which spread a processing liquid across a layer of the film unit to initiate the formation of a visible image.

The periphery of the second or lower flat plate 42 may be frictionally engaged by the adjacent surfaces of the ridge 44 to removably secure the second flat plate 42 in the pocket 50 to allow its secure positioning as a part of the overlay sandwich. Indeed, the friction fit to hold the lower plate 42 in place may necessitate the forming of a tab (not shown) projecting into a recess (not shown) in the ridge 44 to allow manual disengagement of the two flat plates.

Note particularly in FIG. 2 that the lower surface of plate 42 is approximately flush with the lower extension of ridge 44. Preferably, the ridge 44 forming the pocket 50 extends for about 0.035 inches below the bottom flat surface of the flat plate 40. Preferably, the acetate overlay 36 has a thickness of about 0.005 inches and the lower flat plate 44 has a thickness of about 0.03 inches. Note also that the ridge 44 preferably does not exceed the thickness of wall 24 plus the rib 22. Thereby, the overlay 36 and indeed the whole assembly including the overlay 36 are maintained out of any direct physical contact with the upper surface of the film units 16 as they are exposed to light and ejected sequentially.

This invention may be practiced or embodied in still other ways without departing from its spirit or essential character. The embodiment described herein is therefore illustrative and not restrictive, the scope of the invention being indicated in the appended claims and all variations which come within the meaning of the claims are intended to be embraced thereby.

What is claimed:

1. A photographic overlay assembly for use with a film cassette having therein at least one film unit and having a rib defining an exposure opening in one wall thereof through which the film unit may be exposed, said assembly comprising: a first flat transparent plate having a ridge projecting transversely of one major surface thereof, said ridge and said first plate defining a pocket having a length, a width and a depth;

a thin transparent overlay having indicia thereon, said overlay being adapted to be received within said pocket; and a second flat transparent plate having a length and width, one of which is substantially equal to the corresponding dimension of said pocket so as to be frictionally maintained within said pocket with said overlay sandwiched between said first and second plates.

2. A photographic overlay assembly as defined in claim 1 wherein said ridge encompasses an area having a length and width slightly less than the corresponding dimensions of the exposure opening in the film cassette so as to be capable of being received therein.

3. A photographic overlay assembly as defined in claim 2 wherein said first plate further includes a flange extending outwardly of said ridge whereby said flange rests on the rib of the film cassette when said ridge is located within the exposure opening.

4. A photographic overlay assembly as defined in claim 3 wherein said ridge has depth less than the combined thickness of the cassette's rib and wall whereby said photographic overlay assembly is maintained out of contact with a film unit when said ridge is received within the exposure opening.

5. A photographic overlay assembly as defined in claim 3 wherein said flange includes a cut-away section which is dimensioned to allow a film advancing member of a camera to engage an underlying film unit.

* * * * *